United States Patent [19]

Seefert

[11] Patent Number: 4,588,325

[45] Date of Patent: May 13, 1986

[54] MODULAR ROCK REPLACING DRAIN FIELD APPARATUS

[76] Inventor: Kenneth F. Seefert, 10003 Mendel Rd., Stillwater, Minn. 55082

[21] Appl. No.: 634,459

[22] Filed: Jul. 26, 1984

[51] Int. Cl.⁴ ............................................. E02B 13/00
[52] U.S. Cl. ....................................... 405/46; 405/43; 210/170
[58] Field of Search ............................ 405/36, 43–49, 405/51; 210/170, 292, 293

[56] References Cited

U.S. PATENT DOCUMENTS

| | | | |
|---|---|---|---|
| 271,089 | 1/1883 | Lynch | 405/45 |
| 2,366,522 | 1/1945 | Gutman | 405/46 |
| 3,339,366 | 9/1967 | Gogan et al. | 405/36 |
| 3,645,100 | 2/1972 | LaMonica | 405/46 |
| 3,820,341 | 6/1974 | Richard et al. | 405/46 |
| 4,145,157 | 3/1979 | Lascelles | 405/43 |
| 4,182,581 | 1/1980 | Uehara et al. | 405/43 |
| 4,192,628 | 3/1980 | Gorman | 405/46 X |
| 4,319,998 | 3/1982 | Anderson | 210/170 X |

FOREIGN PATENT DOCUMENTS 28937 of 1904 United Kingdom ................. 405/43

Primary Examiner—Cornelius J. Husar
Assistant Examiner—Nancy J. Stodola
Attorney, Agent, or Firm—Douglas L. Tschida

[57] ABSTRACT

Apparatus and a method for constructing a sewage drain field without a rock media. The drain field includes a plurality of lengthwise connected drain pipes suspended above the trench bottom within a channel formed by a plurality of elongated mesh-like channel forming members and in overlying relation to which assembly a porous, conforming length of sheet goods is mounted. As necessary, mesh-like end caps seal the ends of the channel forming members. Independently mounted filter elements may be used to filter the grey water and/or channel the grey water in lieu of the conduit.

22 Claims, 17 Drawing Figures

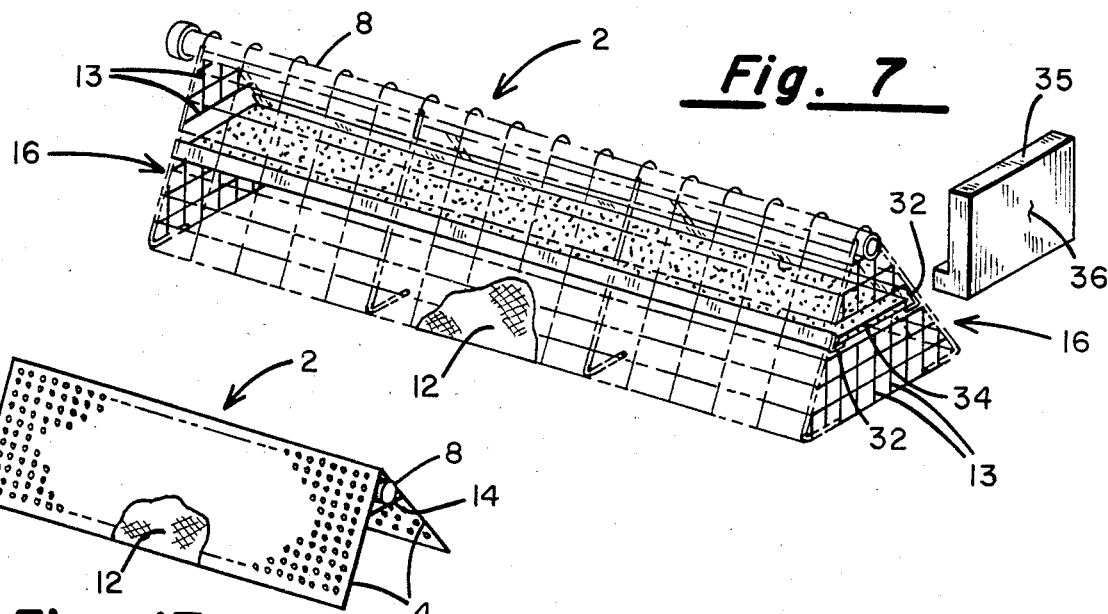
Fig. 7
Fig. 17
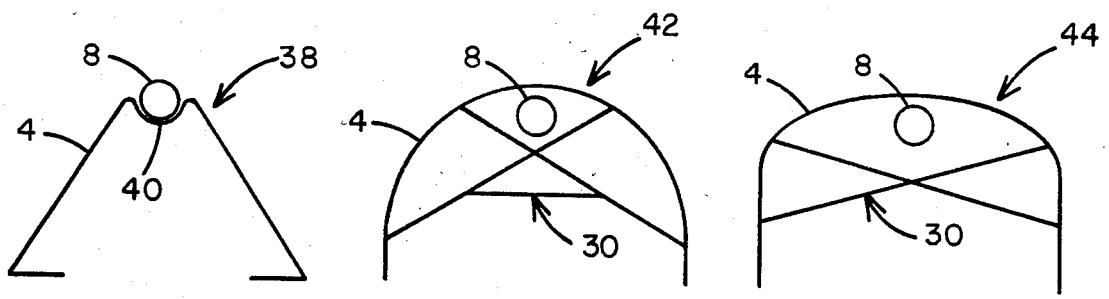
Fig. 8  Fig. 9  Fig. 10
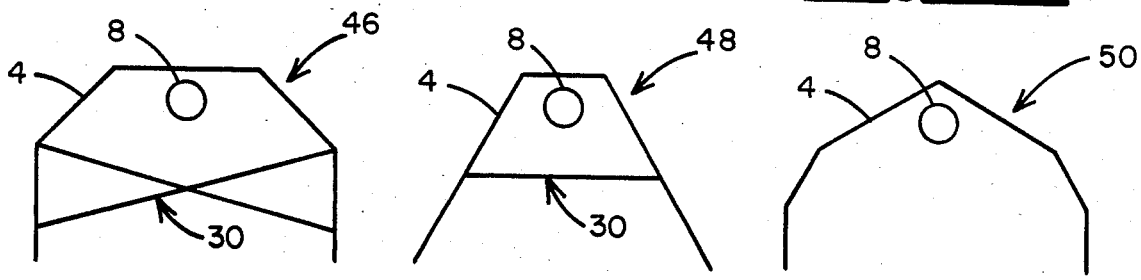
Fig. 11  Fig. 12  Fig. 13
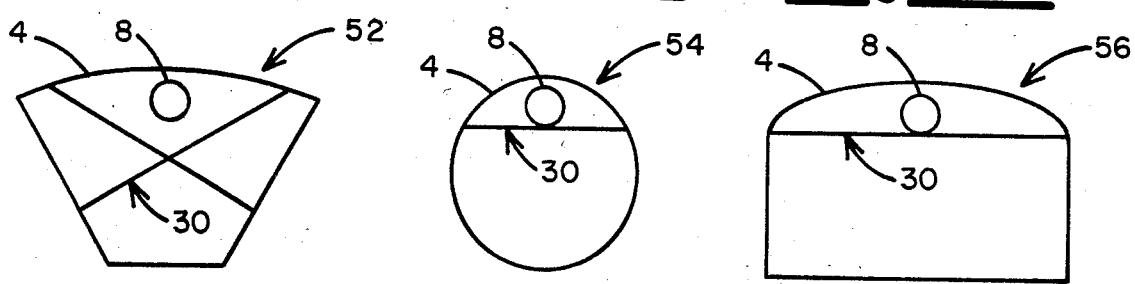
Fig. 14  Fig. 15  Fig. 16

MODULAR ROCK REPLACING DRAIN FIELD APPARATUS

BACKGROUND OF THE INVENTION

The present invention relates to sewage disposal systems and, in particular, to an improved drain field construction for economically maximizing the exposed percolation surface area while permitting evaporation through covered mesh-like channel defining members and from which members lengths of drain tile are suspended.

Home sewage systems have long formed a part of rural living with each home or waste generating facility having an associated septic tank for containing liquid and solid waste matter and from which the waste is either periodically pumped into tank trucks or returned to the soil as grey water via the drain field. It is with respect to the latter type of disposal system that the present invention is directed and wherein the septic tank is typically coupled to a downstream distribution box and from which a plurality of trenches and drain lines radiate and serve to distribute and return the grey water and decomposed solid matter to the soil, whereat it is absorbed and filtered by the soil before entering the ground water.

Initially, during the sizing of a drain field, the amount of required soil surface area is determined in relation to the projected amount of effluent that the field will serve and the percolation rate of the soil itself. Upon performing percolation tests on the soil to determine the rate at which the effluent will be absorbed, a desired percolation area and corresponding length and number of trenches can be determined for a given size dwelling.

While the actual construction for any given sewage system will depend upon pertinent plumbing codes, a drain field is typically constructed to include a plurality of trenches dug to a width of approximately three feet and to a depth of not exceeding three and a half feet. Thus, for one hundred lineal feet of trench, approximately three hundred square feet of surface percolation area is provided for absorption. Each trench being typically back filled with gravel of an average aggregate size of approximately one inch and over which the drain tile is placed before the trenches are further back filled with rock and finally the removed top soil.

In terms of manpower and equipment, the above construction requires equipment for trenching the individual lines, equipment for conveying to and filling the trenches with the gravel or rock and equipment for backfilling the drain field, once completed. As labor and equipment costs have risen, not to mention the rising cost for the gravel itself, it has therefore become a more costly matter to install such systems. Consequently, the present invention was conceived in order to reduce these costs, while providing an equally efficient system and possible a system that may be used with previously marginal soils. In particular, the present invention achieves these and other ends via a modularly constructed apparatus which mounts within the individual trenches in a fashion so as to replace the gravel previously used, while forming hollow porous mesh-like channels within which the effluent may be received, before being absorbed by the soil and/or evaporating through the walls of the channel to the surface and air.

Two previous attempts at developing drain fields not requiring rock filler media can be seen upon directing attention to U.S. Pat. Nos. 3,579,995 and 4,415,157. Of these attempts, the former discloses a vented leeching channel that is assembled from a plurality of lengthwise connected cast concrete structures. Each so-called "shed-like structure" contains a plurality of apertures through its sidewalls and a plurality of aperture protecting lips for preventing against the filling of the channels with dirt. The latter patent discloses a molded plastic drain field section having a center-mounted drain pipe and associated side troughs, which together permit the replacement of the rock filler. In use, however, the actual amount of soil exposed to effluent is limited by the soil exposed to the side troughs. For both of these patents, too, evaporative action is limited by the solid upper construction of the channel forming members and upon which the back filled dirt rests.

Various other unrelated irrigation/drainage assemblies have also been noted in U.S. Pat. Nos. 463,871; 988,639; 1,608,889; 3,333,422; 3,440,823; 4,102,135; and 4,188,154. Each of these, however, is intended for the distribution or removal of liquids in other than drain field applications and then without concern for decomposing materials contained within the liquids.

Because of the above-mentioned cost concerns and need for an absorptive/evaporative drain field, the present invention was conceived and which comprises a modularly constructed drain field having a plurality of lengthwise connected, air permeable channel forming meshwork members that are capable of supporting the overlying top soil. Suspended from the channel forming members are a plurality of lengthwise connected drain pipes or conduits for appropriately conveying to the effluent within the drain field. When assembled, drain fields of the present type provide the following advantages: (1) they provide a greater absorption surface area per lineal foot of trench, thus permitting a reduction in the overall drain field size; (2) they permit pumping and periodic maintenance in order to extend the life of the drain field; (3) they permit evaporation; (4) they provide an increased volume capacity within the channel; and (5) they require less equipment and labor to install than previously required.

The above objects, advantages and distinctions as well as the construction of the present invention will, however, become more apparent upon directing attention to the following description thereof with respect to the appended drawings. Before referring thereto, though, it is to be recognized that the present description is made with respect to the presently preferred embodiment only and that, accordingly, various modifications may be made thereto, such as in the shape or configuration of the channel, type of materials used, etc. without departing from the spirit and scope thereof.

SUMMARY OF THE INVENTION

A sewage disposal system, the drain field of which is constructed from a plurality of lengthwise connected channel forming meshwork members which are assembled in the drain field trenches in combination with an overlying permeable layer of sheet goods. Together the channel forming members and layer of cloth, in one embodiment, support the overlying back fill, while permitting absorptive and evaporative action from the channel. Suspended interiorly of the channel forming members are a plurality of lengthwise connected effluent conveying conduits and/or filter elements having apertures formed therein for draining the effluent into the formed channels and thence to the soil.

In one embodiment of the invention, each channel forming member comprises a length of mesh formed from a plurality of grid members that are spaced apart from one another in each of at least two planes and that are secured to each other at their points of contact so as to form a grid of an appropriate soil supporting mesh size. The cross-sectional shape of the mesh is formed so as to define a lengthwise channel or hollow void, upon being lengthwise connected and assembled within a trench. Suspended interiorly of the channel from a plurality of axially spaced apart hangers are a plurality of lengthwise coupled, aperture containing conduits. As required, conforming mesh-like end caps seal the channels. Overlying the channel forming grid, in turn, is a smaller mesh layer and then a porous rot resistant, permeable cloth that separates the soil from the channel and the contained effluent.

In another embodiment, the channel forming members are formed from a structurally stable, perforated sheet goods that can be assembled in the trench as an inverted "V" and wherefrom the effluent directing conduits are suspended from wire hangers connected to each side. In other embodiments, the channel forming members when viewed in cross-section are formed to exhibit a variety of other curvilinear or multi-sided soil supporting configurations. The channel forming members may also be fabricated from coated metals, rot resistant plastics or other composites of rot resistant materials or perforated rot resistant sheet materials.

BRIEF DESCRIPTION OF THE DRAWINGS

FIG. 7 shows a disposable filter assembly that can be used with the apparatus of FIG. 1.

FIG. 8 shows a cross-sectional view of an assembly like that of FIG. 1 wherein the conduit is supported above the channel forming members.

FIG. 9 shows a cross-sectional view of an arcuately formed assembly and its cross supports.

FIG. 10 shows a cross-sectional view of an assembly having an arcuate upper portion and appropriate cross bracing.

FIG. 11 shows a cross-sectional view of an assembly having a number of flat upwardly extending portions and appropriate cross bracing.

FIG. 12 shows a cross-sectional view of a tented assembly having a flat top and appropriate cross bracing.

FIG. 13 shows a cross-sectional view of an upwardly pointed assembly of relatively broad width, and which does not use cross bracing.

FIG. 14, shows a cross-sectional view of a frusto-conical tubular assembly with appropriate cross bracing.

FIG. 15 shows a cross-sectional view of a cylindrically tubular and its cross bracing.

FIG. 16 shows a cross-sectional view of a modified rectangular tubular assembly having an arcuate upper portion and appropriate cross bracing.

FIG. 17 shows a perspective view of an embodiment like that of FIG. 1 but wherein a multi-apertured sheet-like channel forming member is used.

DESCRIPTION OF THE PREFERRED EMBODIMENT

Figure 1:
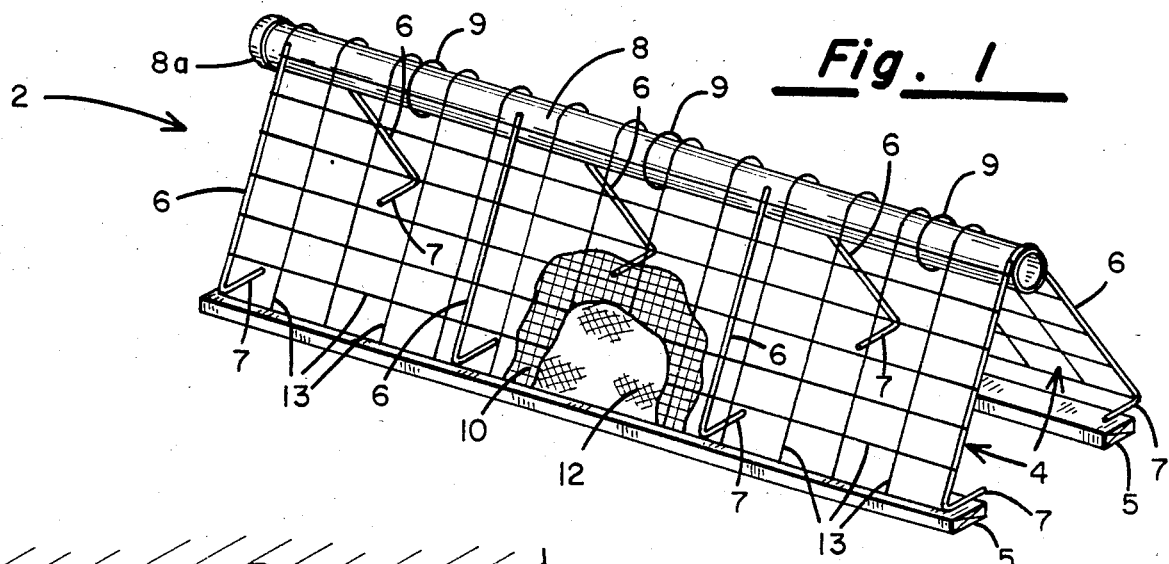
FIG. 1 shows a perspective view of an assembled section of the present drain field channel forming members in relation to a length of effluent conducting conduit and cloth cover.

Referring to FIG. 1, a perspective assembly view is shown of a section of the present modular drain field apparatus and which typically is constructed in 10 foot lengths so as to be more compatible with the handling etc. that is encountered before being installed in any given septic system. Other lengths, however, may be used equally as well. The assembled section 2 of FIG. 1 generally comprises a pair of rot resistent channel forming and conduit supporting meshwork members 4 that are arranged in the shape of an inverted "V" or tented structure and each of which halves have a number of axially spaced apart, mesh support members 6 for supporting the members 4 in a desired cross-sectional configuration. The support members 6 are made from a suitable angle iron or rod stock. Each mesh support 6, in turn, at its lower end contains an inwardly bent ground foot support 7 and a lengthwise extending support member 5 upon which the feet 7 rest for minimizing the settling that might otherwise occur for some soil types, due to the overlying weight of the back filled soil. The support member 5 also being made of a suitable rot resistant material. Alternatively, the mesh channel forming members 4 might be bent inwardly beneath the feet 7, approximately three to four inches and whereby additional support can be obtained with or without the support members 5. Still further, other weight displacing foot members 7 (not shown) could be welded or otherwise attached to the mesh channel forming members 4 for supporting the channel forming members 4 within the trenches, with or without the use of the support members.

Mounted beneath the apex of the channel forming members 4 is a length of effluent conducting conduit 8 that contains a plurality of apertures in its lower surface and wherefrom the effluent drains into the channel formed beneath the channel members 4 and above the trench bottom. Typically, the conduit 8 is purchased in 10 foot lengths and is constructed from suitable rot resistant materials, such as PVC or other plastics, and is assembled in the trench by gluing successive lengths of the conduit 8 together, each section mounting within the belled or flared end 8a of the previous length of conduit 8.

The conduit 8 is, in turn, supported within the channel formed by the mesh channel members 4 and beneath the apex thereof by a number of hangers 9 that are attached therealong every two to three feet in between the supports 6. For the embodiment of FIG. 1, these hangers or straps 9 comprise simple wire supports that extend through the members 4 and beneath the conduit 8, before being wrapped over the apex of the assembled members 4. This spacing is sufficient and the hangers 9 are wide enough to support the conduit 8 and the weight of the conveyed effluent without damaging the pipe.

In overlying relation to the mesh side members 4 then is mounted a finer mesh material 10 or so-called "chickenwire" and finally a length of Celanese ® cloth 12 and the fibers of which are woven in a sufficient density to support the overlying earth relative to the mesh channel forming members 4 and chickenwire 10. Like the chickenwire 10, the cloth material 12 is rot resistant and provides a permeable membrane for surface ground water, such as rain or snow melt, to drain through and for permitting the evaporation of the moisture contained within the channel formed by the side members 4. It is to be noted that the chickenwire 10 may or may not be employed, depending upon the mesh size of the channel forming members 4.

Directing particular attention now to the mesh channel forming members 4, it is to be noted that in the presently preferred embodiment, they are bent so as to form in cross-section an Isosceles triangle, approximately three feet wide at the base and one and a half feet tall. Each meshwork members 4 is fabricated from a relatively sturdy mesh that is in turn constructed from a plurality of grid members 13 that are welded together with grid openings in the range of 1 to 6 × 1 to 6 inches or 1 to 36 square inches and which spacing is sufficient in combination with the Celanese ® cloth 12 and chickenwire 10 to support the overlying earth. The individual grid members 13 may also be constructed from any number of materials, for example, wire, rebar, plastic, composites of plastic coated or galvanized metals or any number of other materials so long as they are sufficiently rot resistant and able when assembled to support the loading without undue flexing.

In the embodiment of FIG. 1, the grid members 13 comprise a quarter inch rod or rebar stock that has been double galvanized or plastic coated. A 5 × 5 inch mesh spacing is also employed. It is to be recognized, however, that a range of desired loading capabilities can be obtained by varying the number of intermediate support members 6 and/or by using grid members 13 of smaller or larger diameter and/or by using greater or smaller mesh spacings. Alternatively, too, by using a smaller mesh spacing, then the use of the chickenwire 10 may be avoided.

In the embodiment of FIG. 1, the mesh channel forming members 4 are also formed in halves and because of which they may easily be stacked and transported before assembly at the job site, along with the conduit 8. Depending upon the weight, though, of the assembly 2 and whether or not the feet 7 are added at the installation site, the channel may be formed as a continuous structure and which, so long as it had an open bottom, would permit nesting. It should be recognized, too, that in FIG. 1 the channel forming members 4 appear to be continuous, only because the halves have been welded together at the apex of the assembly 2.

Figure 2:
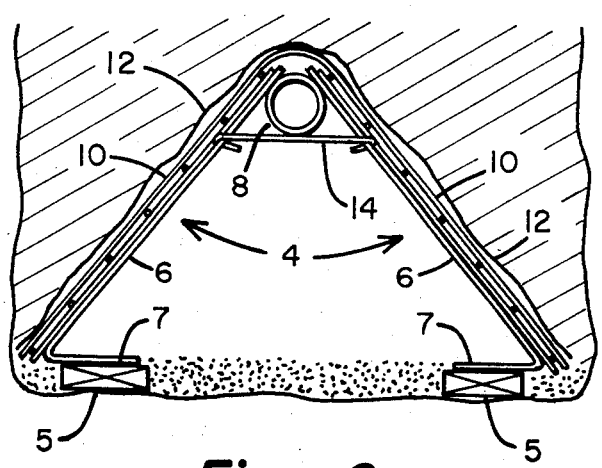
FIG. 2 shows a cross-sectional view of the assembly of FIG. 1 installed in a drain field trench.

Directing attention now to FIG. 2, a cross-sectional view is shown through the assembly 2 of FIG. 1 as it would appear when mounted in a typical drain field trench. In FIG. 2, alternative conduit supporting straps 14 are also shown in their mounting relation to the conduit 8 and which as mentioned are spaced approximately 2 to 3 feet apart so as to support the conduit 8 and its effluent contents. The straps 14 of FIG. 2 mount beneath the conduit 8 and between the sides of the channel forming members 4 and serve not only to support the conduit 8 but also to prevent the sides from pulling apart. This latter condition occurs due to the effect of the overlying earth and which places pressure on the assembly 2 to spread to the outer edges of the trench and/or to collapse. The hangers or straps 9 and 14, the feet 7 and/or supports 5 and 6, however, offset this weight and support the channel members 4 without their collapsing or sinking into the soil. As presently constructed, the support hangers 9 and 14 are made from a relatively light gauge wire or banding stock, due to the rigidity obtained by the grid members 13 and supports 6. Alternatively, where a more flexible grid member 13 is employed and/or larger mesh spacings, it may be preferable to employ a more rigid material.

Figure 4:
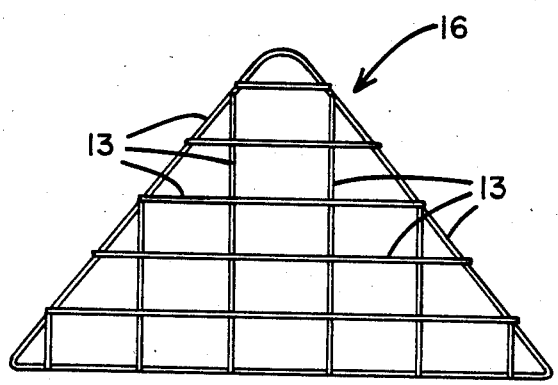
FIG. 4 shows a front view of an end cap used in conjunction with the structure of FIG. 1.
Figure 3:
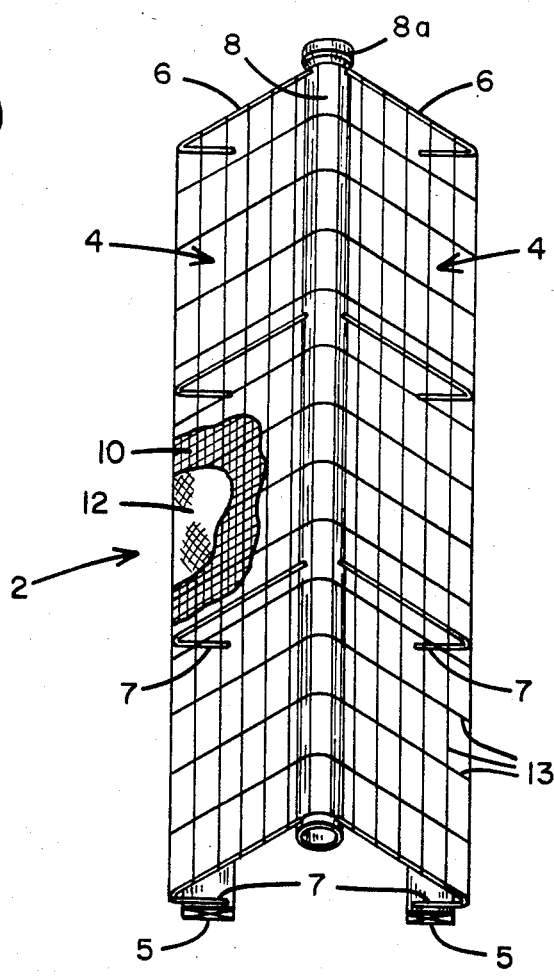
FIG. 3 shows a top view of the structure of FIG. 1.

Directing attention now to FIG. 3, a top view of FIG. 1 is shown and wherein the construction of the present modular drain field apparatus becomes more apparent. Also and shown in FIG. 4 is a mesh-like end cap 16 that is used in conjunction with the channel forming members 4 for terminating the ends of the drain field runs, thereby sealing the ends against the erosion of the surrounding soil into the end of the formed channel. Typically, the end cap 16 is formed from the same mesh material as the channel forming members 4 and is covered with the Celanese ® cloth 12 and chickenwire 10. The end caps 16, if strong enough, may be used alone without a mesh support member 6.

Figure 5:
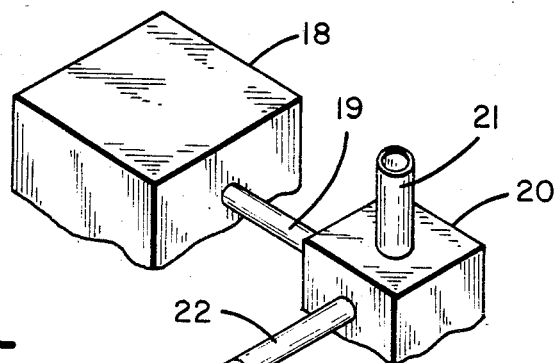
FIG. 5 shows a sewage disposal system for a hillside site constructed from a number of lengthwise connected sections of the structure of FIG. 1.

Directing attention now to FIG. 5, a system diagram is shown of a typical sewage disposal system employing the present modular construction as it would be assembled for a hillside site of approximately 10 to 15 percent grade. As with conventional construction, the effluent is conveyed from a septic tank 18 via a length of conduit 19 to a distribution box 20 having a stand pipe vent 21 and thence via a feeder pipe 22 to a first length of channel 2. From there, the effluent is conveyed to the individual sections 2 via the supported conduit 8 and allowed to sequentially drain into and fill each formed channel. End caps 16 at each of the ends of the channels 2 prevent soil from eroding into each channel 2 and each end cap 16 supports the incoming and outgoing conduit 8.

At the end of the first length of drain field (shown as a single length of channel 2, but which might include additional sections 2), a pair of 90 degree elbows 24 and a length of conduit 26 act to couple the effluent to the next trench and length of channel forming members 4 and conduit 8. Similarly, at the end of the second trench, the conduit 8 is coupled to the next trench and length of channel forming members 4. Each length of the drain field is stepped down the hill at a slightly lower level than the preceding length and, thus, the effluent is conveyed from the septic tank 18 to the drain field where it collects in the channels and is absorbed by the soil. As with all drain fields, the amount of surface area is determined relative to the percolation rate for the soil and the expected amount of effluent and thus the layout and length of each run and the number of trenches are determined in relation thereto.

From FIG. 5 and others, it is also to be appreciated that a greater volume of effluent is accomodated by the presently formed channel forming assemblies 2, since no obstructing filler rock is used. Because, too, of the absence of rock, the formed channels may now be accessed for periodic maintenance, but which will be discussed in detail hereinafter.

Figure 6:
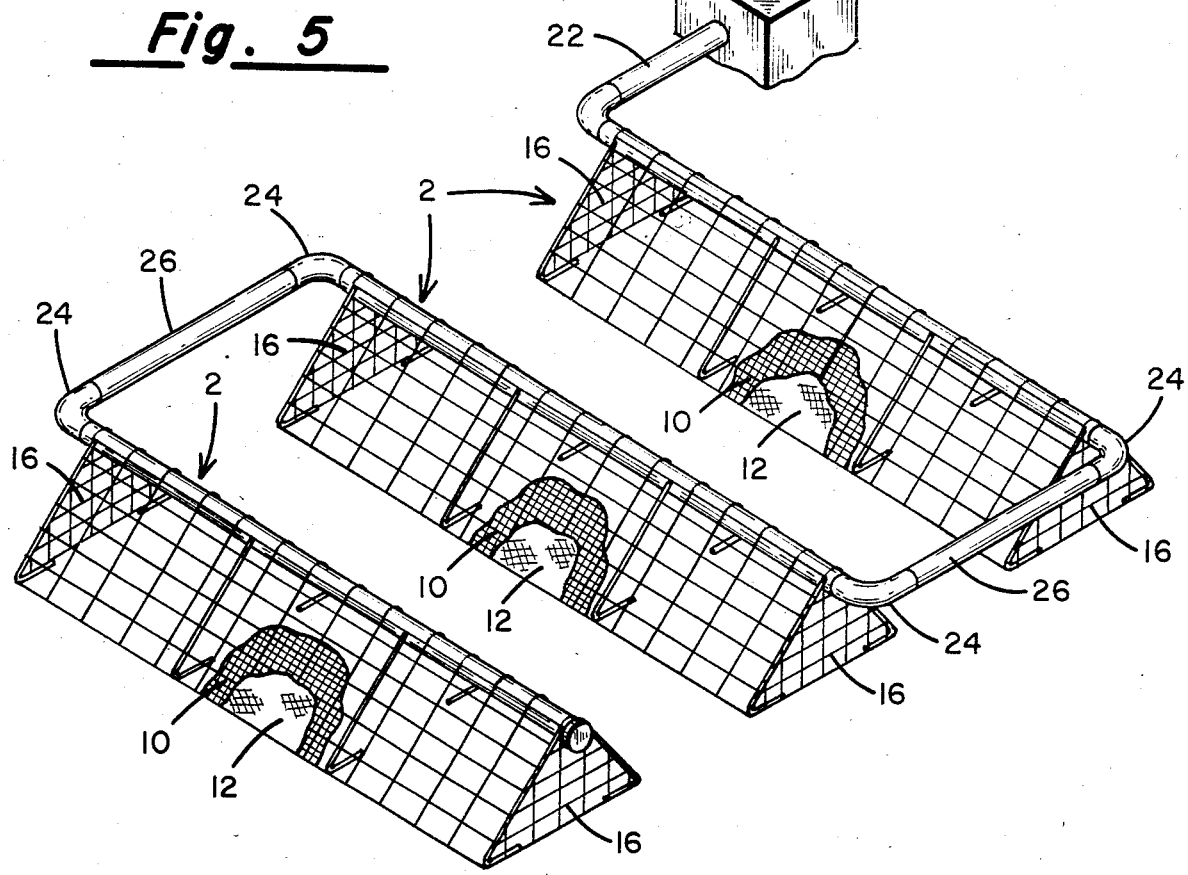
FIG. 6 shows a top view of a typical drain field installed on a flat site.
Figure 6:
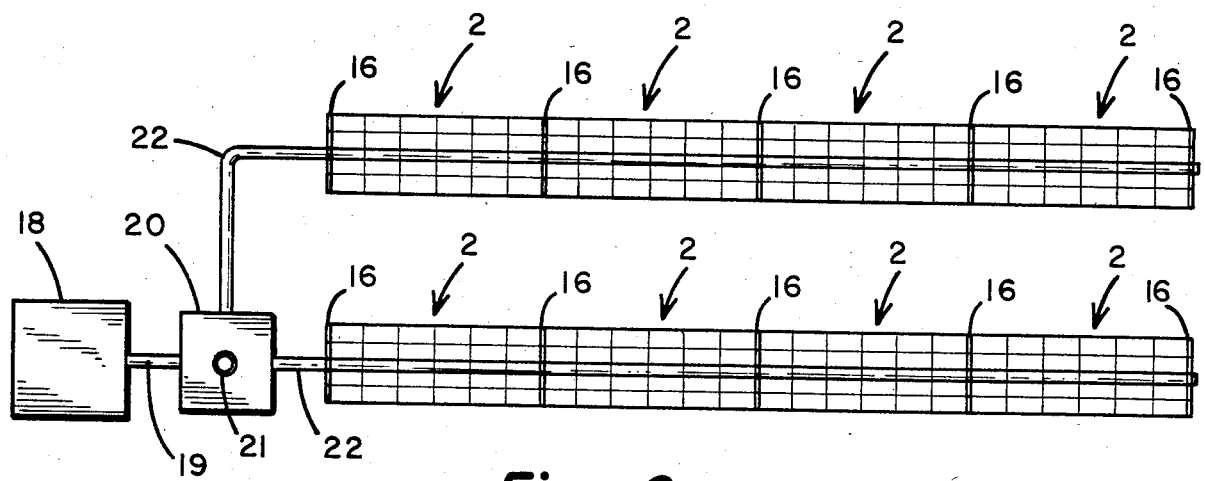

Directing attention next to FIG. 6, a sewage disposal system for a flat site is shown. Here again, the sewage is directed from a septic tank 18 to a vented distribution box 20 and thence to the individual lengths of channel forming drain field. As shown, parallel trenches are now, however, provided for distributing the effluent to the drain field. From the foregoing, it is to be further recognized that still other system configurations are achievable with the present channel forming assemblies 2 and thus FIGS. 5 and 6 are in no way to be interpreted as self-limiting. In fact, it is believed that any system previously constructed from rock and conduit 8 may be implemented with the present apparatus.

Before directing atttention to a plurality of alternative crosssectional outlines that the present mesh channel forming members 4 may exhibit, attention is first directed to FIG. 7. There a single channel section 2 is shown in phantom relative to a pair of angle iron guide rails 32 that extend the length of the channel forming members 4 and which are individually mounted to each of one of the halves at a point beneath the conduit 8. Suspended in overlying relation to the soil between the channels 32 is a disposable filter 34 which is used to filter various oils, etc. from the effluent and which might otherwise over time plug or contaminate the drain field soil. Previously, such filtering was not possible due to the use of the rock filler. Instead, upon detecting a plugged condition for a drain field, a homeowner was faced with the proposition of having to install a replacement drain field or alternatively, to switch over to a second identical drain field via the opening and closing of appropriate junctions at the distribution box 20 to shut off the plugged drain field and open the unused portion. After a number of years and during which the organic matter plugging the other drain field would deteriorate, the homeowner could then switch over to the now rejuvenated portion. By employing a filter element 34, it is to be appreciated that the life of a drain field can now be extended even further.

Relative to FIG. 7, it is to be noted that the filter element 34 would typically be changed by removing an access cover 35 from an access housing 36 positioned at one or more of the ends of the channel assemblies 2 and/or at each individual trench so as to gain access to the filter elements 34. As depicted, the access housing 36 is shown displaced from the end cap, however, in practice it is to be appreciated that the lower bent portion would align with an opening through the end cap, while the access cover would be positioned at grade or just below grade. Upon removing the cover 35, each filter 34 could then be slidably removed from the channel assembly 2 by reaching into the channel assembly 2 via the housing 36. At present, it is contemplated that the filter elements 34 would be approximately 8 to 12 inches wide, be made from Celanese® cloth and be mounted in a flexible frame. Thus relative to the angle iron members 32, they would have sufficient rigidity over time so as not to collapse and fall to the bottom of the channel and trench. In any case, if this did happen, it is contemplated that they could be retrieved and replaced via the access housing 36. Alternatively, it is also contemplated that in combination with the members 32, straps could be mounted between the oppositely mounted sides of the members to support the filter if it should sag.

In this latter regard, it is still further contemplated that in lieu of using a conduit 8, a strap supported filter 34 mounted in concave relation to the bottom of the channel could be used to direct the grey water along the channel, at the same time as it was filtered. The curvature of the filter 34 would tend to channel the water and disperse it along the length of the channel as it leaked through the filter 31. As the filter 34 became plugged, the grey water would be directed farther along the channel and/or spill over its side edges and into the channel where the soil would act as before. With this embodiment, too, it is contemplated that a regular maintenance schedule would have to be followed for replacing the filter 34. The filter 34 for this embodiment would also possibly include a chicken wire support mesh upon which the filter material would be mounted and/or additional lengthwise supports would be mounted in the channel between the straps.

It should also be apparent that in combination with the replacement of the filter elements 34, one is now more readily able to treat the soil as by appropriate organic dissolving agents and which can be admitted to the channels by the housings 36 and/or by a mechanical scrapping member that can also be inserted thereby and used to rake the bottom surface of the soil. In passing, it is also to be noted that for various types of soils, the splashing of the effluent that might otherwise occur without the use of the filter element 34 may be alleviated with a one to three inch sand fill at the bottom of the trench as shown in FIG. 2. The use of a filter 34 is, however, preferred.

Directing attention now to FIGS. 8 to 19, mention will be made to a variety of possible alternative cross-sectional configurations that might be used in conjunction with the lengthwise mesh channel forming members 4. While each of the following shapes will be described only with respect to the outline of the mesh member 4, it is to be recognized that in conjunction therewith, appropriate support feet 7, chickenwire 10 and/or fabric 12 would also be used as previously described. Therefore and referring first to FIG. 8, a cross-sectional outline view is shown of an assembly 38 wherein the apex is formed with a concave recess 40 wherein the conduit 8 is now retained external to the mesh member 4, in lieu of the previous internal mounting. The bottom edge of the mesh 4 has also been bent, as mentioned previously, to act as support feet.

Referring next to FIGS. 9 to 13, a variety of other open-bottom shapes are shown, along with possible examples of cross-bracing 30 that might be used in conjunction therewith. As presently contemplated, the cross bracing 30 would typically mount in combination with the support members 6. Also, and if the filters 34 are used, it is to be expected that the configuration of the bracing 30 would be altered to accomodate the rails 32 and/or straps and filter elements 34. Specifically, and referring to FIG. 9, a channel forming assembly 42 is shown and wherein the channel forming member 4 exhibits an arcuate outline and beneath which the cross bracing 30 is mounted. The conduit 8 then being mounted in overlying relation to and supported by the cross bracing 30. FIG. 10, in turn, shows a cross-sectional view of an assembly 44 that exhibits an arcuate upper portion and vertical sides relative to its cross bracing support members 30. The conduit 8 is again supported above the cross bracing 20. FIG. 11 shows an assembly 46 similar to that of FIG. 10, but wherein the arcuate upper portion of the assembly 44 is replaced with a number of flat portions. FIG. 12 next shows an assembly 48 wherein the apex of the channel forming member 4 is flat and wherein a single cross brace support member 30 is attached to opposite sides of the channel forming member 4. Finally, FIG. 13 shows an assembly 50, like the assembly 46, but wherein the upper flat portion is peaked and wherein no cross-bracing 30 is employed.

Directing attention next to FIGS. 14 through 16, a number of tubular assemblies are shown wherein the channel forming member 4 is continuous in cross-section and thus includes a mesh bottom. First referring to the assembly 52 of FIG. 14, there a tubular mesh member 4 is shown having an arcuate upper portion and inwardly directed frusto conical sides that taper inwardly to a narrow bottom portion. Internal cross bracing 30 adds rigidity to the assembly. FIG. 15 next depicts an assembly 54 wherein a circular cross-section is exhibited and the cross bracing 30 is mounted near the upper portion thereof, again supporting the conduit 8. Finally, FIG. 16 shows a generally rectangular assembly 56 having an arcuate upper portion and beneath which the cross bracing 30 is mounted for again supporting the sidewalls and conduit 8.

With attention directed to FIG. 17, it is also to be recognized that while the present invention has been described with respect to the use of a lengthwise mesh channel forming member 4, the member 4 may be fabricated from a solid material having perforations formed therethrough. For example, an appropriately supported and perforated plastic sheeting may be used and which might look like the assembly 2 shown in FIG. 17. There the channel forming members 4 are fabricated from a suitably perforated rot resistant sheet material, such as PVC, with holes of a size on the order of ¾ inch in diameter and with ¾ inch spacing between holes. Not shown, but mounted along the length of the members 4 would again be positioned mesh supports 6 and which would probably be required in greater quantities, depending on the flexibility of the material, although stiffeners might also be embedded in the material. End caps 16 constructed of the same material and/or in the fashion of FIG. 4 would also be used. Similarly, it is contemplated that the cloth 12 would be mounted over the entire assembly 2. Again, too, the conduit 8 and/or a filter element 34 may be used to channel and filter the grey water.

While the present invention has been described with respect to its presently preferred modular form and the use thereof in a number of systems, not to mention a variety of cross-sectional shapes that might be employed in conjunction with the lengthwise mesh-like channel forming member, it is to be recognized that still further modifications might be made thereto by those of skill in the art. Accordingly, it is contemplated that the following claims should be interpreted so as to include all those equivalent embodiments within the spirit and scope thereof.

What is claimed is:

1. In a sewage disposal system apparatus for distributing effluent over the trenched surface of an effluent absorption bed and wherein no filler gravel is required comprising:
   (a) a lightweight soil supporting framework including a plurality of rib members coupled to one another to subtend an elongated hollow chamber having an open bottom and ends and mountable in a prepared trench;
   (b) a rot resistant, soil supporting first meshwork mounted over said assembled framework, the porosity of said meshwork being dense enough to prevent the infiltration of dirt and rock into the chamber, yet permit evaporation and the permeation of liquid therethrough; and
   (c) means suspended within said hollow chamber for receiving and distributing effluent over the surface of the absorption bed;
   (d) the effluent thereby being absorbed by the underlying soil and evaporating through the air and liquid permeable walls of said apparatus.

2. Apparatus as set forth in claim 1 wherein said first meshwork comprises a metallic grid formed from a plurality of grid members arranged in first and second overlying planar relation to one another and attached to one another at their points of overlying intersection and having grid openings on the order of one to thirty-six square inches between adjacent grid members and including a rot resistant, woven cloth fabric mounted thereover.

3. Apparatus as set forth in claim 1 wherein said first meshwork comprises a rot resistant metal screen.

4. Apparatus as set forth in claim 1 wherein the bottom edges of said first meshwork are bent interiorly beneath the bottom of said framework in the regions where it contacts the bottom of the drain field trench to form lengthwise extending support feet.

5. Apparatus as set forth in claim 4 including means mountable beneath the trench bottom contacting edges of the apparatus and displacing a relatively large soil surface area and supporting said meshwork covered framework for preventing said apparatus from sinking into the bottom of the drain field trench upon covering the apparatus over with soil.

6. Apparatus as set forth in claim 1 wherein the crossectional outline of said meshwork covered framework when viewed on end substantially exhibits an inverted "V" shape.

7. Apparatus as set forth in claim 1 including a tubular conduit extending the length thereof and having a plurality of apertures formed therethrough for conveying effluent to the absorption bed over the length of said chamber.

8. Apparatus as set forth in claim 2 including a second more finely spaced meshwork than said first meshwork mounted between said first meshwork and said rot resistant cloth.

9. Apparatus as set forth in claim 1 including means for supporting said conduit means in overlying displaced relation to the bottom of the chamber.

10. Apparatus as set forth in claim 2 wherein said first meshwork includes end caps mountable to the open ends of said framework for sealing the ends thereof against soil infiltration.

11. Apparatus as set forth in claim 1 including means displacing a relatively large soil surface area for supporting said apparatus in non-sinking relation to the bottom of a drain field trench upon covering said apparatus with soil.

12. Apparatus as set forth in claim 6 wherein the apex of said inverted "V" mesh-like member is arcuate.

13. Apparatus as set forth in claim 1 wherein said first meshwork comprises first and second overlying planes of parallel, spaced apart grid members, wherein said grid members in one plane are positioned at a predetermined angle relative to the grid members in the other plane and said grid members are attached to one another at their points of overlying intersection.

14. Apparatus as set forth in claim 2 wherein said grid members are coated with a rot resistant material.

15. Apparatus as set forth in claim 1 wherein said first meshwork comprises a rot resistant plastic planar member fabricated as a continuous sheet of material and perforated over its entire surface.

16. Apparatus as set forth in claim 1 including means mounted within said chamber for filtering the effluent of suspended solids before contacting the absorption bed.

17. Apparatus as set forth in claim 5 wherein the cross-sectional shape of said meshwork covered framework when viewed on end substantially exhibits an inverted "V" shape.

18. In a sewage disposal system apparatus for distributing effluent over the trenched surface of an effluent absorption bed comprising:
   (a) a lightweight soil supporting framework comprised of a plurality of rib members coupled to one another to subtend an elongated hollow chamber having an open bottom and ends and mountable in a prepared trench;
   (b) a plurality of rot resistant meshwork layers mounted over said framework and each other, the porosity of each layer becoming successively more dense to in combination support overlying soil between said rib members and prevent the infiltration of dirt and rock into said chamber, yet permit evaporation therefrom and the permeation of liquid therethrough;
   (c) a length of conduit suspended within said chamber having a plurality of holes formed through the walls thereof for receiving and distributing effluent over the length of said chamber;
   (d) a filter member suspended beneath said conduit for filtering solids from the effluent before being deposited on said absorption bed; and
   (e) means for removably mounting said filter member within said chamber, thereby permitting the changing of said filter member;
   (f) the effluent thereby being absorbed by the underlying soil and evaporating through the air and liquid permeable walls of said apparatus.

19. Modular drain field apparatus comprising:
   (a) a lightweight, rot resistant, soil supporting meshwork member having a plurality of perforations therethrough over a substantial portion of the surface area thereof and subtending a lengthwise hollow chamber having an open bottom and ends upon being buried in a prepared trench of an evaporation bed;
   (b) a pair of meshwork end caps mounted to the opposed ends of the chamber forming member;
   (c) a rot resistant cloth fabric permeable to air and water mounted over said chamber forming meshwork member for supporting the overlying soil between the perforations and preventing the infiltration thereof into said chamber; and
   (d) means permeable to water mounted within said lengthwise channel for receiving and conveying effluent along the length of said chamber and filtering solids therefrom as said effluent is deposited along the length of the chamber and allowed to be absorbed into the evaporation bed.

20. Modular drain field apparatus comprising:
   (a) a lightweight, rot resistant, soil supporting wire meshwork member having a plurality of perforations therethrough over a substantial portion of the surface area thereof and subtending a lengthwise hollow chamber having an open bottom and ends upon being buried in a prepared trench of an evaporation bed;
   (b) a pair of wire meshwork end caps mounted to the opposed ends of the chamber forming member;
   (c) a rot resistant cloth fabric permeable to air and water mounted over said chamber forming meshwork member for supporting the overlying soil between the perforations and preventing the infiltration thereof into said chamber; and
   (d) means permeable to water mounted within said lengthwise channel for receiving and conveying effluent along the length of said channel and filtering solids therefrom as said effluent is deposited along the length of the chamber and allowed to be absorbed into the evaporation bed.

21. Apparatus as set forth in claim 20 wherein said wire meshwork comprises a plurality of wire meshwork layers mounted in overlying relation to one another to in combination with said cloth fabric achieve a sufficient porosity to prevent the infiltration of dirt and rock into said chamber, yet permit evaporation therefrom and the permeation of liquid therethrough.

22. In a sewage disposal system apparatus for distributing effluent over the trenched surface of an effluent absorption bed and wherein no filler gravel is required comprising:
   (a) a lightweight soil supporting framework comprised of a plurality of rib members coupled to one another to subtend an elongated hollow chamber having an open bottom and ends and mountable in a prepared trench;
   (b) a plurality of rot resistant wire meshwork layers mounted over said framework and each other, the porosity of each layer becoming successively more dense to in combination support overlying soil and prevent the infiltration of dirt and rock into said chamber, yet permit evaporation therefrom and the permeation of liquid therethrough; and
   (c) means suspended within said hollow chamber for receiving, filtering and distributing effluent over the surface of the absorption bed;
   (d) the effluent thereby being absorbed by the underlying soil and evaporating through the air and liquid permeable walls of said apparatus.

* * * * *